United States Patent [19]

Couture et al.

[11] 4,315,043
[45] Feb. 9, 1982

[54] COATING OF GRANULATED ORGANIC DYES WITH AN EPOXY

[75] Inventors: Joseph E. G. Couture; Joseph N. A. Roy, both of Ste-Foy, Canada

[73] Assignee: Her Majesty the Queen in Right of Canada, as represented by the Minister of National Defence, Ottawa, Canada

[21] Appl. No.: 189,113

[22] Filed: Sep. 22, 1980

Related U.S. Application Data

[60] Continuation of Ser. No. 104,759, Dec. 18, 1979, abandoned, which is a division of Ser. No. 52,302, Jun. 26, 1979, Pat. No. 4,225,368.

[30] Foreign Application Priority Data

Mar. 2, 1979 [CA] Canada ................................... 324566

[51] Int. Cl.³ .......................... B05D 7/00; B05D 7/24
[52] U.S. Cl. ......................................... 427/212; 8/524; 8/526; 106/308 M; 260/37 EP
[58] Field of Search ............. 260/37 EP, 42.21, 37 P; 427/212; 106/308 M; 8/524, 526

[56] References Cited

U.S. PATENT DOCUMENTS 3,904,562 9/1975 Hopfenberg ........................ 427/212
3,935,339 1/1976 Cooke ................................. 427/212
4,001,035 1/1977 Ito .................................... 260/42.21

FOREIGN PATENT DOCUMENTS 1378261 10/1964 France ............................... 427/221

Primary Examiner—Sam Silverberg
Attorney, Agent, or Firm—Cushman, Darby & Cushman

[57] ABSTRACT

A method of coating an organic dye composition with an inert coating material, such as an epoxy resin, is disclosed which improves the mechanical properties of the organic dye particles and enables the production of pour-castable colored smoke-producing compositions of high solids loading.

9 Claims, No Drawings

COATING OF GRANULATED ORGANIC DYES WITH AN EPOXY

CROSS-REFERENCE TO RELATED APPLICATIONS

This application is a continuation of our earlier application Ser. No. 104,759 filed Dec. 18, 1979, now abandoned, which in turn is a division of application Ser. No. 52,302, filed June 26, 1979, now U.S. Pat. No. 4,225,368.

This invention relates to organic dye compositions of improved mechanical properties and to a method of coating the dye with an inert coating material which enables the production of pour-castable coloured smoke-producing compositions of high solids loading, particularly when a red dye e.g. Disperse Red 9, is employed.

The problem of obtaining a dye for incorporation into pour-castable coloured smoke-producing compositions is addressed by applicant in co-pending Canadian applications Ser. No. 259,735, filed Aug. 24, 1976 now Canadian Pat. No. 1,056,688 and Ser. No. 247,694, filed Mar. 11, 1976 now Canadian Pat. No. 1,047,492. It was found by applicant that solids loading of the order of 78–85%/w, depending upon the dye employed could be obtained by increasing the particle size of the dye from about 20 microns to 100–1000 microns while maintaining the viscosity within acceptable limits i.e. less than 10 kP. Granular organic dye materials having an average particle size of 500 to 700 microns are particularly useful for incorporation into pour-castable smoke-producing compositions.

In view of fluctuations of the end-of-mix (EOM) viscosity of the smoke-producing compositions, which become more important as the maximum solids loading is approached, a more conservative desirable maximum, EOM viscosity of 5 kP was deemed appropriate for pour-castability.

However, in the case of Disperse Red 9, Colour Index name for 1-methylamino anthraquinone (1-MAAQ), reaction with the polybutadine based binder occurs and the EOM viscosity of the composition is increased. Further, the red dye is much more active than other dyes in reducing the curing potential of diisocyanate curing agent for the binder. Formulations containing the red dye also exhibit a shore 'A' hardness of 22 as compared to an average of about 30 for other dyes, after 6 days at about 60° C. As a result, solids loading in the red dye containing composition is limited to 80%/w and even at that level, castability is marginal.

According to one aspect of the invention, an organic dye composition is contemplated, comprising (a) about 85–90 w of an organic dye of a particle size of 100 to 1000 microns, and (b) about 15–10%/w of an inert non-sticking coating material uniformly coating said organic dye.

The term "inert" is used in the sense that the coating does not react with the binder commonly used in such smoke-producing compositions, namely a polybutadiene based binder.

A 90/10 ratio is preferred since it is preferable to maintain the amount of coating agent at a minimum level, the coating agent being inert insofar as smoke production is concerned.

According to another aspect of the invention, a method of coating an organic dye of a particle size of 100 to 1000 microns with an inert non-sticking coating materials comprising:

(a) providing a reactor containing water heated to the reaction temperature, (b) introducing said organic dye and coating material into said reactor, (c) agitating to form a dispersion of the reactants in water, and (d) maintaining said reaction temperature and agitation to prevent agglomeration and ensure uniform coating of the dye particles, until the coated dye particles are cured.

The coating material must be compatible with all the ingredients of the smoke producing composition in which the coated dye is to be incorporated. It has been found that epoxy resins have the required properties. Any low viscosity epoxy resin (liquid diglycidyl ether of bisphenol A) diluted with 5 to 20% of butyl glycidyl ether is suitable. Epon-815, a trade mark of Shell Chemical Company is preferred, since it cures quickly to a hard material and it is compatible with the dye, the dispersion liquid and the smoke composition.

Suitable coating materials identified by their trade marks are as follows: Epon-815, Shell Chemical, liquid DGEBA diluted with 11%/w butyl glycidyl ether (BGE); DER-334, Dow Chemical, DGEBA diluted with 12% BGE; EPOTUF 37-130, Reichold Chemical, same as DER-334; ARALDITE-506, Ciba Products Co., Same as EPON 815; ERLA-2500 and ERL-2795, Union Carbide, DGEBA diluted with 3% BGE; EPON-820, DGEBA with 20% BGE.

The coating composition is preferably cured in situ using an amine curing agent. The preferred coating composition is a mixture of 85–90, preferably 85, parts by weight of Epon-815 and 15–10, preferably 15, parts by weight of benzyldimethylamine.

In the case wherein the inert coating material is an epoxy resin, one of the novel features consists in dispersing the dye in water and effecting the coating and curing in situ. A good dispersion of the coated dye particles must be maintained by agitation until curing of the epoxy coating is completed. Complete curing is indicated when the coated dye particles no longer tend to stick together.

The employment of the water medium presents two advantages: First, water is one of the rare liquids in which organic dyes are insoluble. Second, water has a catalytic effect on the reaction of an epoxy and an amine group (the preferred epoxy coating is a mixture of an epoxy resin and an amine curing agent). Thus, curing of the epoxy resin in promoted.

The key is to apply an inert uniform coating on the surface of the dye graunules while preventing them from sticking to each other and forming a hard cake. To achieve this the coated granules were dispersed in water, and the dispersion maintained by agitation until curing of the epoxy coat was complete.

The installation used for the coating method is conventional and consists of a 5-gallon Teflon® lined vessel containing a baffle and a 5 inch (12 cm) marine-type mixing propeller. In operation the propeller is rotated at 150 rpm and the vessel is maintained at constant temperature by controlling the flow of steam through the jacket. The reactor is first filled with water and agitated while being heated to the reaction temperature (60° C.); the granulated dye is then poured into the reactor, followed by the required amount of premixed epoxy coating agent. Due to the agitation the coating agent readily forms an emulsion which fixes itself to the surface of the dye. The agitation as well as the temperature are maintained for two hours. Success is assured if strong turbulent mixing is maintained to keep the dye well dispersed and prevent agglomeration; this agitation must be maintained until the reaction has proceeded to the point where the particles will not stick together i.e. curing of the epoxy is complete. The suspension is then filtered and rinsed with cold water, drained and placed in an oven at 100° C. for 2 days to dry.

Burning tests conducted with generators filled with coloured smoke-producing compositions formulated with treated and untreated dyes showed equivalent results in terms of burning time and smoke performance (colour and volume). However, processing, curing characteristics and mechanical properties are influenced differently depending on the particular dye employed.

Most of the work was carried out with red dye i.e. Disperse Red 9, as this technique was developed primarily to solve the processing problems encountered with this dye. Table I contains EOM viscosities (measured at 60° C. with a Brookfield Model RVF 60 min after the addition of the curing agent) and Shore "A" hardness after 6 days of curing at 60° C. for coated and uncoated red dye compositions. Each composition has a solid distribution of 38, 32, 8 and 2 parts of dye, KClO3, lactose and sodium bicarbonate. At 80% solids, the EOM viscosity is reduced from 5 to 2.2 when coated dye was used instead of uncoated granulated dye; however the drop in viscosity becomes greater when the solids load is increased. At 84% the EOM viscosity is lowered from 21.1 to 2.8 kP. The use of coated dye influences the physical properties of the cured composition as well. With treated dye, hardness is double that obtained with untreated dye.

TABLE I

EFFECT OF COATED DYE IN RED SMOKE-GENERATING COMPOSITIONS

| Solids % by wt. | Dye | EOM Viscosity kP at 60° C. | Shore "A" Hardness (6 days at 60° C.) |
|---|---|---|---|
| 80% | UNCOATED | 5 | 22 |
| | COATED | 2.2 | 45 |
| 84% | UNCOATED | 21.1 | 23 |
| | COATED | 2.8 | 45 |

Table II shows comparative results for green (Smoke Green 4. C.I. name for 70% solvent green 3, 20% benzanthrone, 10% Vat Yellow 4); violet (Dye Mix, Violet C.I. name for 20% Disperse Red-9, 80% 1,4 diamino dihydro anthraquinone); red (Disperse Red-9, Colour Index, (C.I.) name for 1-methylamino anthraquinone [1-MAAQ]) and yellow (Smoke Yellow 6, C.I. name for 36% dye Vat Yellow 4, 64% benzanthrone) compositions containing 80% solids. In all cases, the curing mechanism is influenced by the dye because the Shore "A" hardness and mechanical properties are improved by the use of coated dye. While the EOM viscosity is not really reduced with other than the red dye there is actually an increase with the yellow dye. The general improvement in hardness and mechanical properties shows that the coating stops the negative action of the dye on the binder. A typical binder comprises 57%/w Poly B-D R45M (a polybutadiene based binder manufactured by ARCO Chemical Company under trademark), 25%/w isodecyl pelargonate (plasticizer) and 18%/w DDI (a trademark for a diisocyanate intermediate made from a 36 carbon dimer aliphatic dibasic acid) as curing agent.

TABLE II

PROPERTIES OF SMOKE-GENERATING COMPOSITIONS WITH COATED AND UNCOATED DYE

| Color | Dye | EOM Viscosity kP at 60° C. | Hardness Shore "A" 6 days at 60° C. | Mechanical Properties at 22.8° C. (aging 0 day) | | |
|---|---|---|---|---|---|---|
| | | | | $\delta_m$ kPa | $\epsilon_m$ cm/cm | Modulus kPa |
| Red | UNCOATED | 5.0 | 22 | 350 | 30 | 1900 |
| | COATED | 2.2 | 45 | 420 | 26 | 3500 |
| Violet | UNCOATED | 2.5 | 30 | 370 | 40 | 1700 |
| | COATED | 2.6 | 45 | 600 | 31 | 3470 |
| Yellow | UNCOATED | 1.7 | 46 | 530 | 32 | 3400 |
| | COATED | 6.0 | 56 | — | — | — |
| Green | UNCOATED | 2.1 | 33 | 370 | 35 | 2150 |
| | COATED | 1.6 | 48 | 475 | 26 | 4640 |

NOTE:
Red Comp., 38, 32, 8, 2 parts by wt of Dye, KClO3, Lactose, NaHCO3
Others: 40, 30, 8, 2 parts by wt of Dye, KClO3, Lactose, NaHCO3

The processing technique for coating dye with an epoxy thus proved to be a solution to the high viscosities and the poor curing of the red compositions formulated with R-45M polybutadiene. At 80% solids the coated dye was required with red dye only; with other colors, the coating improves curing and mechanical properties but acceptable results can be obtained with uncoated dye.

The organic dye compositions are formulated according to the standard procedure of adding the inert material i.e. the binder, to the mixer first, although when using the coated dye no reaction between the dye and binder will occur.

In the examples, the fuel component employed was lactose. In order to lower the decomposition temperature and to adjust the burning rate lactose may be replaced by sulphur as follows:

TABLE III

| Color | Dye | KClO3 | Sodium Bicarbonate | Sulfur | Binder (R45M) |
|---|---|---|---|---|---|
| Violet | 40 | 26 | 7 | 7 | 20 |
| Yellow | 42 | 24 | 7 | 7 | 20 |
| Green | 42 | 24 | 6 | 8 | 20 |
| Red | 41 | 25 | 6 | 8 | 20 |

TABLE IV

| Organic dye composition %/w | Coated | Uncoated |
|---|---|---|
| Dye (Disperse | | |

TABLE IV-continued

| Organic dye composition %/w | Coated | Uncoated |
| --- | --- | --- |
| Red 9) | 39.9 | 39.9 |
| KCPO$_3$ | 33.6 | 33.6 |
| Lactose | 8.4 | 8.4 |
| NaHCO$_3$ | 2.1 | 2.1 |
| Binder(R45M) | 16 | 16 |
| EOM Viscosity kP at 60° C. | 2.8 | 21.2 |

As seen in table IV, in an organic dye composition wherein the dye employed is red i.e. Disperse Red 9, that a solids loading of a 4%/w, the EOM viscosity at 60° C. is about 2.8 whereas the EOM viscosity of the same uncoated dye composition is about 21.2.

It will be apparent to those skilled in the art that the present invention may be embodied in forms other than those specifically described herein without departing from the spirit or central characteristics of the invention. Thus, the specific embodiments described above are to be considered as illustrative and by no means restrictive.

The embodiments of the invention in which an exclusive property or privilege is claimed are defined as follows:

1. A method of coating an organic dye of a particle size of 100 to 1000 microns with an inert non-sticking coating comprising an epoxy resin, comprising
   (a) providing a reactor containing water heated to the reaction temperature,
   (b) introducing said organic dye and said coating material into said reactor,
   (c) agitating to form a dispersion of the reactants in water, and
   (d) maintaining said reaction temperature and agitation to prevent agglomeration and ensure uniform coating of the dye particles, until the coated dye particles are cured.

2. A method according to claim 1, wherein the inert coating material further comprises an amine curing agent for the epoxy resin.

3. A method according to claim 2, wherein the inert coating material is cured in situ.

4. A method according to claim 1, 2, or 3, wherein the reaction temperature is about 60° C., which is maintained for about two hours.

5. A method according to claim 2, wherein the inert coating material comprises 80-90 parts by weight of the epoxy resin and about 20-10 parts by weight of the curing agent.

6. A method according to claim 5, wherein the inert coating material comprises about 85 parts by weight of the epoxy resin and about 15 parts by weight of the curing agent.

7. A method according to claim 6, wherein the curing agent includes benzyldimethylamine.

8. A method according to claim 7, wherein the epoxy resin comprises about 89%/w diglycidyl ether of bisphenol A and about 11%/w butylglycidyl ether.

9. A method according to claim 1, 2 or 8, wherein the resulting coating particles of organic dye each comprise:
   (a) about 90%/w of an organic dye selected from the group consisting of Disperse Red 9, smoke Green 4, Dye Mix Violet and smoke Yellow 6, and
   (b) about 10%/w of an epoxy resin coating material uniformly coating said organic dye.

* * * * *